United States Patent Office 3,159,589
Patented Dec. 1, 1964

3,159,589
METHOD FOR THE PREPARATION OF POLYAROMATIC RESINS
Peter Richard Bloomfield and Kenneth Parvin, London, England, assignors to Artrite Resins Limited, London England, a British company
No Drawing. Filed Oct. 17, 1960, Ser. No. 62,849
Claims priority, application Great Britain Oct. 21, 1959
1 Claim. (Cl. 260—2)

The invention relates to the preparation of polyaromatic resins.

According to the present invention there is provided a method of preparing polyaromatic resins which method comprises condensing an aromatic or a conjugated heterocyclic dihalide or polyhalide having at least two reactive halogen atoms alone, or condensing an aromatic or conjugated heterocyclic dihalide or polyhalide having at least two relatively reactive halogen atoms with an organic di- or poly-halide having two reactive halogen atoms or a dihalide derived from a dibasic inorganic or substituted-inorganic acid, said condensation taking place in a substantially dry and inert solvent by elimination of halogen atoms effected by finely divided lithium metal. Preferably the reactants are condensed in the presence of substantially anhydrous tetrahydrofuran as reaction medium.

The invention also provides a method of preparing polyaromatic resins which method comprises condensing in a reaction medium of substantially anhydrous tetrahydrofuran, an aromatic or conjugated heterocyclic dihalide or polyhalide having at least two reactive halogen atoms alone, or condensing an aromatic or conjugated heterocyclic dihalide or polyhalide having at least two reactive halogen atoms with an organic di- or poly-halide having two reacting halogen atoms or a dihalide derived from a dibasic inorganic or substituted-inorganic acid, said condensation taking place by elimination of halogen atoms effected by finely divided sodium metal.

The method according to this invention may be effected by condensing one reactant which is an aromatic or conjugated heterocyclic dihalide or polyhalide having at least two reactive halogen atoms as set forth in Reaction 1. Alternatively two types of reactants may be employed, these being (a) an aromatic or conjugated heterocyclic dihalide or polyhalide having at least two reactive halogen atoms and (b) an organic dihalide or polyhalide having two reactive halogen atoms or a dihalide derived from a dibasic inorganic or substituted inorganic acid. This alternative reaction is set forth hereafter as Reaction 2.

The method according to this invention may also be carried out in two stages: the polyhalide is first reacted with the metal to form an aromatic or conjugated heterocyclic dilithium or disodium compound and this is then condensed with an organic polyhalide having at least two reactive halogen atoms, an organic dihalide or a dihalide derived from a dibasic inorganic or substituted-inorganic acid, as set forth below in Reaction 3.

Reaction (1) $A-Ar-X + 2M \longrightarrow -[Ar]_n- + 2MX$

Reaction (2) $X-Ar-X + X-R-X + 4M \longrightarrow -[Ar-R]_n- + 4MX$

Reaction (3) $X-Ar-X + 4M \longrightarrow M-Ar-M + 2MX$
$M-Ar-M + X-R-X \longrightarrow -[Ar-R]_n- + 2MX$ where
Ar=difunctional group which can be an aromatic conjugated heterocyclic or substituted group of these types.
M=Li or Na.
X=Cl, Br or I.
R=difunctional group which can be aliphatic, aromatic, heterocyclic or a substituted (e.g. halo-substituted) group of these types, or a difunctional group derived from a dibasic inorganic or substituted-inorganic acid.

Examples of dichlorides of dibasic inorganic or substituted-inorganic acids are: $RBCl_2$; $R_2SiCl_2$; $R_2GeCl_2$; $R_2SnCl_2$; $RPCl_2$; $RP(O)Cl_2$; $RP(S)Cl_2$; $RAsCl_2$, where R is phenyl or methyl.

Examples of dichlorides of dibasic inorganic acids are:

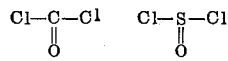

The aromatic dihalide or polyhalide having at least two reactive halogen atoms is preferably a di- or polyhalide derived from benzene or from diphenyl or from diphenyl ether. The conjugated heterocyclic halide is one having aromatic properties and is preferably an halide derived from a triazine. The dihalide derived from a dibasic inorganic or substituted inorganic acid is preferably derived from a diphenyl silicon diol or from dimethyl silicon diol.

The temperature of the reactant mixture may be maintained at the temperature below 0° C. The reaction generally proceeds as the solution of the dihalide or polyhalide in the reaction medium is added to a dispersion of the metal in the reaction medium. After the addition is completed, the mixture is allowed to reach room temperature and may then be heated if necessary to complete the reaction. The reaction mixture may be finally hydrolysed with water to isolate the polymer.

The invention may be carried out with various mixtures of the types of reactants to produce resins having varied or modified properties. Also, the relative quantity in the reaction mixture of the organic di- or poly-halide having two reactive halogen atoms or the dihalide derived from a dibasic inorganic or substituted-inorganic acid may vary from 0 to 1 equivalent, as compared with the aromatic or conjugated heterocyclic component; such a variation can be used therefore to produce a variety of materials having intermediate properties from the two extreme cases.

It has been found that polyaromatic resins which have a high degree of aromatic constituents contained therein, and which do not contain any of the well-known substituents which readily cause breakdown of the polymeric molecule under the action of heat (such as, e.g., nitro groups), withstand high or fairly high temperatures.

The invention also includes the products resulting from the methods of preparing polyaromatic resins described and claimed.

The invention is illustrated by the following examples:

*Example 1*

Phenylene 1,4 dilithium was prepared by reacting p-dibromobenzene with four equivalents of lithium metal in tetrahydrofuran at −60° C. The solution of phenylene 1,4 dilithium obtained was then reacted with one equivalent of p-dibromobenzene at −20° C. to give an almost quantitative yield of polyphenylene.

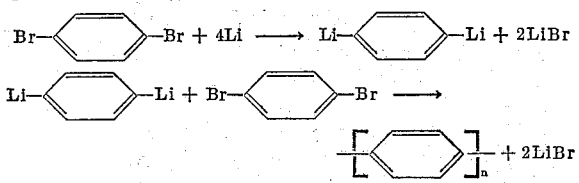

The polymer prepared by this method was soluble in tetrahydrofuran, and had a softening point of 250° C.

Example 2

A solution of p-dichlorobenzene in tetrahydrofuran was added to a suspension of two equivalents of sodium metal cooled so that the reaction occurred at —10° C. After the addition the mixture was warmed to 20° C. and then hydrolysed with water. The polymer was obtained after removal of the solvent.

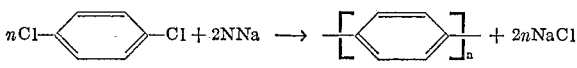

This polymer was similar to that obtained in Example 1.

Example 3

A solution of 2-phenyl 4,6-dichloro-s-triazine in tetrahydrofuran was added to two equivalents of lithium metal suspended in tetrahydrofuran at —40° C. An exothermic reaction occurred and a dark red solution of the polymer was obtained. After stirring for 1 hour at 40° C., the mixture was allowed to warm to room temperature. Water was then added and the solvent removed by distillation.

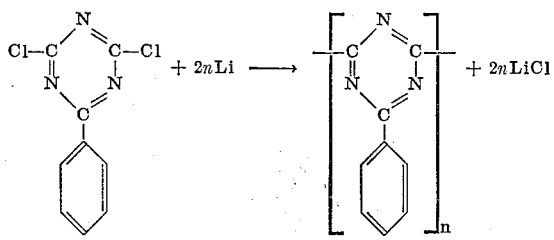

The polymer obtained was soluble in tetrahydrofuran and dioxan and had a very high softening point.

Example 4

28.4 g. 1,4-dibromo 2,3,5,6-tetrachlorobenzene (the bromine atoms being relatively reactive compared with the chlorine atoms) was added to a stirred suspension of two equivalents of lithium metal in tetrahydrofuran at —70° C. The mixture was allowed to warm slowly till reaction commenced and the reaction carried out at 10° to 20° C. After the reaction was complete, the mixture was allowed to warm up to room temperature. Water was then added and the solvent removed by distillation.

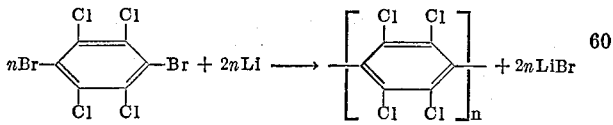

A brown polymer was obtained and this proved to be soluble in benzene and softened at 240° C.

Example 5

An equimolar mixture of p-dibromobenzene and diphenylsilicon dichloride, dissolved in tetrahydrofuran was added to four equivalents of lithium metal dispersed in tetrahydrofuran at —20° C. An exothermic reaction occurred and after stirring for one hour at —20° C., the mixture was allowed to reach room temperature slowly. Water was added and solvent removed by distillation to give a theoretical yield of a white polymer.

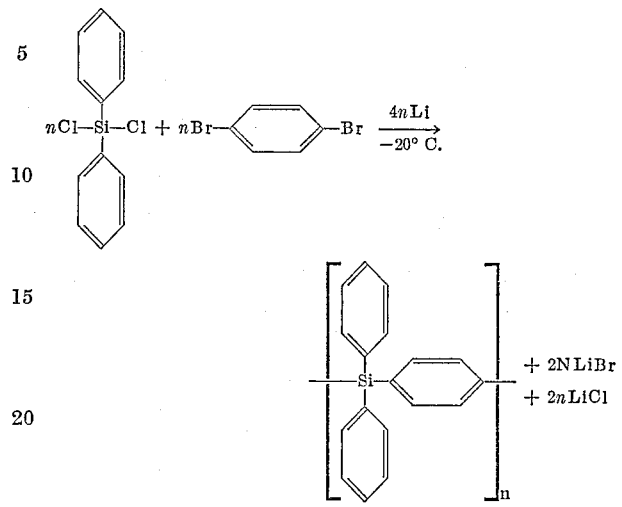

This polymer softened at about 300° C., and was partially soluble in benzene.

Example 6

A solution of 23.7 g. of m-dichlorbenzene in 80 ml. of tetrahydrofuran was added dropwise to 2.24 g. of lithium were stirred in tetrahydrofuran at —40° C. An exothermic reaction occurred and the lithium reacted to give a dark brown solution. After 1 hour the mixture was slowly warmed to room temperature and then hydrolysed by water. The polymer was isolated by distillation of the tetrahydrofuran.

Example 7

A solution of 24 g. of a mixture of equal parts of ortho-, meta- and para-dichlorbenzene in 50 ml. of tetrahydrofuran was added dropwise to 2.28 g. of lithium metal stirred in 80 ml. of tetrahydrofuran at —40° C. An exothermic reaction occurred and the lithium reacted to give a black solution. After 1 hour at —40° C., the mixture was warmed to room temperature and hydrolysed with water. The polymer was isolated by distillation of the tetrahydrofuran. This copolymer containing ortho-, meta- and para-phenylene units had a softening point of about 220° C.

Example 8

A solution of 31 g. of 4,4'-dibromodiphenylether in 50 ml. of tetrahydrofuran was added dropwise to 1.3 g. of lithium metal stirred in tetrahydrofuran at —40° C. An exothermic reaction occurred and the lithium slowly dissolved to give an orange solution. This was allowed to warm to room temperature and hydrolysed by water. The polymer was isolated by distillation of tetrahydrofuran. The polymer was light brown in colour, softened at 150° C. and was soluble in many organic solvents.

Example 9

15.55 g. of phenyl dichloro-s-triazine and 16.2 g. of p-dibromobenzene were dissolved in 70 ml. of dry tetrahydrofuran, and added dropwise to 1.91 g. of lithium wire at —37° to —40° C. in tetrahydrofuran. The contents of the reaction vessel were stirred under dry nitrogen. An immediate exothermic reaction was observed and an intense purple solution was formed as the reaction proceeded. The reactants were allowed to rise slowly to ambient room temperature and then 30 ml. of water were added dropwise to react with unreacted lithium.

The tetrahydrofuran was distilled off; and water was added until distillation temperature was 99° C. A brown solid residue was filtered off, washed with water and dried in vacuo. The residue was purified by extraction with benzene in a Soxhlet apparatus. On removal of the benzene, a reddish-brown polymer was obtained which softened at about 98° C.

Example 10

22.72 g. of solid hexachlorobenzene and 15.54 g. of dichlorophenylphosphineoxide were dissolved in 50 ml. of tetrahydrofuran. This solution was added to an equivalent quantity of lithium metal (2.213 g.) in 75 mls. of tetrahydrofuran at —60° C. with efficient stirring. The mixture was warmed and a reaction commenced at 0° C. The reaction was completed by warming the mixture to 30° C. for 1 hour. Water was added to the mixture to react with residual lithium, and the mixture was subsequently steam distilled to remove tetrahydrofuran and other volatile materials. A brown polymer was obtained which was then dissolved in a mixture of benzene and alcohol and filtered to remove insoluble impurities. The polymer was recovered by evaporation of the solvent

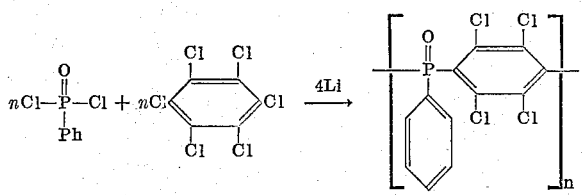

Example 11

A solution of 8.6 g. of 3,5-dichloropyridine in 50 ml. of tetrahydrofuran were added to two equivalents of lithium metal (0.746 g.) which was stirred in 50 mls. of tetrahydrofuran at —40° C. An exothermic reaction occurred and the lithium dissolved. After three hours at —40° C. the mixture was slowly warmed to room temperature, hydrolysed with water and steam distilled to remove the tetrahydrofuran and other volatile materials. A black oily residue was obtained and this was dissolved in a mixture of toluene and alcohol and filtered to remove insoluble impurities. A black solid polymeric product was recovered by evaporation of the solvent.

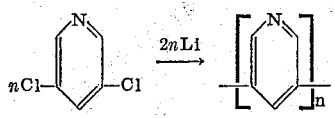

Example 12

A solution of 49 g. of dichlorophenylphosphine and 40.3 g. of p-dichlorobenzene in 100 mls. of tetrahydrofuran were added to lithium metal (7.604 gm.) which was stirred in 150 mls. of tetrahydrofuran at —30° C. An exothermic reaction occurred and the lithium dissolved. After stirring for 6½ hours at —30° C. the mixture was warmed to room temperature. The resin produced was isolated as described in Example 11.

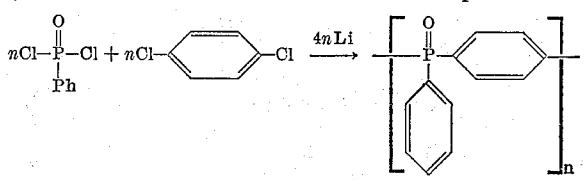

We claim:

A method of preparing polyaromatic resins, which method comprises condensing at least one organic compound having at least two reactive halogen atoms selected from the group consisting of polyhalides of benzene, dihalophenyl-triazine, dihalo pyridine, dihalodiphenyl-silicon, dihalodiphenyl ether, dihalophenyl phosphine and mixtures thereof in a substantially anhydrous tetrahydrofuran medium and in the presence of a finely divided metal selected from the group consisting of lithium and sodium.

References Cited in the file of this patent

UNITED STATES PATENTS 2,775,563    Wiczer _____ Dec. 25, 1956

OTHER REFERENCES

Royals: Advanced Organic Chemistry, Prentice-Hall, Inc., New Jersey, 1954, page 412 relied on, QD251 R68.

Hearney et al.: Journal Chemical Society, pages 3930–8 (1957).

Jacobson: Journal American Chemical Society, vol. 54, pages 1513–8 (1932).

Sirks: Recueil des travaux chimiques des Pays-Bas, vol. 65, pages 850–8 (1946).

Wittig et al.: Chemical Berichte, vol. 91, pages 883–94 (1958).